United States Patent [19]

Anderson et al.

[11] Patent Number: 5,248,741

[45] Date of Patent: Sep. 28, 1993

[54] CATIONIC, ADVANCED EPOXY RESIN COMPOSITIONS INCORPORATING GLYCIDYL ETHERS OF OXYALKYLATED AROMATIC OR CYCLOALIPHATIC DIOLS

[75] Inventors: Kenneth W. Anderson; Richard A. Hickner, both of Lake Jackson, Tex.

[73] Assignee: The Dow Chemical Company, Midland, Mich.

[21] Appl. No.: 977,591

[22] Filed: Nov. 17, 1992

Related U.S. Application Data

[60] Continuation of Ser. No. 575,119, Aug. 30, 1990, abandoned, which is a continuation-in-part of Ser. No. 372,065, Jun. 27, 1989, abandoned, which is a division of Ser. No. 128,249, Dec. 3, 1987, Pat. No. 4,863,575.

[30] Foreign Application Priority Data

Jul. 16, 1987 [WO] PCT Int'l Appl. .................. PCT/US87/01690

[51] Int. Cl.$^5$ .................. C08G 59/14; C08K 3/20; C08L 63/02
[52] U.S. Cl. .................. 525/526; 525/525; 525/527; 528/89; 528/102; 528/103; 523/404; 204/181.7
[58] Field of Search .................. 204/181.7; 523/404; 525/524, 525, 527, 526; 528/103, 104, 108, 109, 111, 117, 118, 121, 123, 89, 102

[56] References Cited

U.S. PATENT DOCUMENTS

| | | | |
|---|---|---|---|
| 4,698,141 | 10/1987 | Anderson | 523/416 |
| 4,737,553 | 4/1988 | Gannon et al. | 525/481 |
| 4,820,784 | 4/1989 | Massingill, Jr. | 525/481 |
| 4,845,172 | 7/1989 | Brytus et al. | 525/481 |
| 4,857,567 | 8/1989 | Laugal et al. | 523/415 |

OTHER PUBLICATIONS

Chem. Abs. 112:8764d (1990).
Copending application Ser. No. 07/464,501 filed Jan. 12, 1990 by Richard A. Hickner titled "Cationic, Advanced Epoxy Resin Compositions Incorporating Glycidyl Ethers of Oxyalkylated Aromatic or Cycloaliphatic Diols".

*Primary Examiner*—Robert E. Sellers

[57] ABSTRACT

An advanced epoxy cationic resin useful as an electrodeposition coating having a charge density of from 0.2 to 0.6 milliequivalent of cationic charge per gram of resin is prepared by reacting in the presence of a suitable catalyst (A) a composition comprising (1) at least one diglycidyl ether of (a) an oxyalkylated aromatic diol or (b) an oxyalkylated cycloaliphatic diol or (c) certain oxyalkylated aliphatic diols and (2) at least one diglycidyl ether of a dihydric phenol with (B) at least one dihydric phenol and optionally (C) a monofunctional capping agent. Components (A-1) and (A-2) are employed in quantities such that from 10 to 75 weight percent of the diglycidyl ethers contained in component (A) are contributed by component (A-1), and from 25 to 90 weight percent of such glycidyl ethers are contributed by component (A-2). Components (A) and (B) are employed in such quantities that the resultant epoxy resin has an average epoxide equivalent weight of from 350 to 10,000. The terminal oxirane groups in the thus formed advanced epoxy resin are converted to cationic groups by reacting the resin with a nucleophilic compound and adding an organic acid and water.

25 Claims, No Drawings

CATIONIC, ADVANCED EPOXY RESIN COMPOSITIONS INCORPORATING GLYCIDYL ETHERS OF OXYALKYLATED AROMATIC OR CYCLOALIPHATIC DIOLS

CROSS-REFERENCE TO RELATED APPLICATIONS

This application is a continuation of application Ser. No. 07/575,119, filed Aug. 30, 1990, now abandoned, which is a continuation-in-part of application Ser. No. 07/372,065, filed Jun. 27, 1989, now abandoned, which is a divisional of application Ser. No. 07/128,249 filed Dec. 3, 1987, now U.S. Pat. No. 4,863,575 which claims a priority date of Jul. 16, 1987 (WO) PCT International Application PCT/US87/01690 which are incorporated herein by reference in their entirety.

FIELD OF THE INVENTION

The invention is concerned with cationic, advanced epoxy resin compositions, a method for their preparation and the use of such compositions in cathodic electrodeposition.

BACKGROUND OF THE INVENTION

Electrodeposition has become an important method for the application of coatings over the last two decades and continues to grow in popularity because of its efficiency, uniformity and environmental acceptance. Cathodic electrodeposition has become dominant in areas where highly corrosion-resistant coatings are required, such as in primers for automobile bodies and parts. Epoxy based systems provide the best overall performance in this application and are widely used.

Cathodic electrodeposition resins based on conventional epoxies obtained by reacting liquid diglycidyl ethers of bisphenol A with bisphenol A to produce higher molecular weight epoxy resins have known disadvantages. Such products tend to have excessively high softening points resulting in poor flow out. In addition, such products require excessive amounts of solvent during their preparation. In order to improve flow, it has been proposed to modify such conventional epoxy resins by reaction with a diol in the presence of a tertiary amine catalyst. Thus, Bosso et al., U.S. Pat. No. 3,839,252, describes modification with polypropylene glycol. Marchetti et al., U.S. Pat. No. 3,947,339, teaches modification with polyesterdiols or polytetramethylene glycols. Wismer et al., U.S. Pat. No. 4,419,467, describes still another modification with diols derived from cyclic polyols reacted with ethylene oxide. These various modifications, however, also have disadvantages. Tertiary amines or strong bases are required to effect the reaction between the primary alcohols and the epoxy groups involved. Since these reactions require long cook times, they are subject to gellation because of competitive polymerization of the epoxy groups by the base catalyst. In addition epoxy resins containing low levels of chlorine are required to prevent deactivation of this catalyst.

U.S. Pat. No. 4,419,467 and 4,575,523 describe the reaction of an epoxy resin with oxyalkylated diols to form resins useful in electrodeposition. Such reactions have several attendant disadvantages, such as described in U.S. Pat. No. 4,260,720, Col. 1, lines 25–51. Use of the glycidyl ethers of such a diol, as described herein, eliminates or greatly reduces these problems.

U.S. Pat. No. 4,260,720 teaches the use of glycidyl ethers of cyclic polyols, including oxyalkylated polyphenols, in combination with polymercapto compounds to form electrodeposition resins. These glycidyl ethers were not used in combination with glycidyl ethers of polyphenols and polyphenols, as described herein, nor were there advantageous properties as modifiers for bisphenol A-based epoxy resins in electrodeposition anticipated, such as improvement in film thickness and appearance.

Anderson and Hickner in U.S. Pat. No. 4,698,141 disclose an improvement in a method for preparing an advanced epoxy cationic resin from an epoxy-based resin containing oxirane groups by converting at least some of the oxirane groups to cationic groups. The improvement is stated to reside in using as the epoxy-based resin an advanced epoxy resin obtained by reacting in the presence of a suitable catalyst (1) a diglycidyl ether of a polyetherpolyol such as the condensation product of dipropylene glycol and epichlorohydrin having an epoxy equivalent weight of 185, (2) a diglycidyl ether of a dihydric phenol such as a diglycidyl ether of bisphenol A and (3) a dihydric phenol such as bisphenol A and optionally a capping agent such as p-nonylphenol.

Rao and Hickner in U.S. Pat. No. 4,868,230 disclose an improvement in a method for preparing an advanced epoxy cationic resin from an epoxy-based resin containing oxirane groups by converting at least some of the oxirane groups to cationic groups. The improvement is stated to reside in using as the epoxy-based resin an advanced epoxy resin obtained by reacting in the presence of a suitable catalyst (1) a diglycidyl ether of an aliphatic diol which is essentially free of ether oxygen atoms, such as a diglycidyl ether of 1,4-butanediol, (2) a diglycidyl ether of a dihydric phenol such as a diglycidyl ether of bisphenol A and (3) a dihydric phenol such as bisphenol A and optionally a capping agent such as p-nonylphenol.

Many coating formulations applied by electrodeposition include pigments to provide color, or opacity or application or film properties. U.S. Pat. No. 3,936,405, Sturni et al., describes pigment grinding vehicles especially useful in preparing stable, aqueous pigment dispersions for water-dispersible coating systems, particularly for application by electrodeposition. The final electrodepositable compositions, as described, contain the pigment dispersion and an ammonium or amine salt group solubilized cationic electrodepositable epoxy-containing vehicle resin and other ingredients typically used in electrodepositable compositions. Among the kinds of resins used are various polyepoxides such as polyglycidyl ethers Of polyphenols, polyglycidyl ethers of polyhydric alcohols and polyepoxides having oxyalkylene groups in the epoxy molecule.

The automobile industry still has needs in the areas of controlled film thickness and lower temperature cure systems. The ability to build thicker, uniform films which are smooth and free of defects Will allow the elimination of an intermediate layer of paint known as a primer surfacer or spray primer, previously required to yield a sufficiently smooth surface for the topcoat. Such an elimination results in removal of one paint cycle and provides more efficient operations. Thicker electrocoat primers may also provide improved corrosion resistance.

SUMMARY OF THE INVENTION

The present invention is directed to an advanced epoxy cationic resin having a charge density of from 0.2 to 0.9 milliequivalent of cationic charge per gram of resin prepared by reacting in the presence of a suitable catalyst (A) a composition comprising (1) at least one diglycidyl ether of (a) an oxyalkylated aromatic diol or (b) an oxyalkylated cycloaliphatic diol or (e) certain oxyalkylated aliphatic diol and (2) at least one diglycidyl ether of a dihydric phenol with (B) at least one dihydric phenol and optionally, (C) a monofunctional capping agent; wherein (a) components (A-1) and (A-2) are employed in quantities such that suitably from 10 to 75, more suitably from 10 to 50 and most suitably from 15 to 35, weight percent of the diglycidyl ethers contained in component (A) are contributed by Component (A-1) and suitably from 25 to 90, more suitably from 50 to 90 and most suitably from 65 to 85, weight percent of such glycidyl ethers are contributed by component (A-2); and (b) components (A) and (B) are employed in quantities such that the resultant advanced epoxy resin has an average epoxide equivalent weight of from 350 to 10,000 and preferably from 600 to 3,000;

whereby there is formed an advanced epoxy resin having terminal oxirane groups and subsequently converting the oxirane groups to cationic groups by reacting the resin with a nucleophilic compound and adding an organic acid and water at at least one point during the preparation of the advanced epoxy cationic resin.

The present invention is also directed to a process for preparation of the above advanced epoxy cationic resin from an epoxy resin composition having terminal oxirane groups which process includes the step of converting oxirane groups to cationic groups by reacting a nucleophilic compound with at least some of the oxirane groups of the epoxy resin composition wherein an organic acid and water are added during some part of this conversion, characterized by using as the epoxy resin composition an advanced epoxy resin obtained by reacting in the presence of a suitable catalyst:

(A) a composition comprising (1) at least one diglycidylether of (a) an oxyalkylated aromatic diol or (b) an oxyalkylated cycloaliphatic diol or (c) certain oxyalkylated aliphatic diol, and (2) a diglycidylether of a dihydric phenol, with (B) at least one dihydric phenol wherein (a) (A-1) and (A-2) are employed in such quantities that 10 to 75 weight percent of the glycidyl ethers contained in component (A) are contributed by component (A-1) and from 25 weight percent to 90 weight percent of the glycidyl ethers are contributed by component (A-2); and (b) components (A) and (B) are employed in such quantities that the resultant epoxide equivalent weight is from 350 to 10,000; whereby there is obtained a cationic, advanced epoxy resin having a charge density of from 0.2 to 0.9 milliequivalent of charge per gram of resin.

The present invention is also directed to a coating composition comprising an aqueous dispersion of the above-described cationic, advanced epoxy resin, a method for making such compositions and a method for coating such compositions.

DETAILED DESCRIPTION OF THE INVENTION

The cationic, advanced epoxy resin compositions of the invention contain the resins obtained from a selected advanced epoxy resin having terminal oxirane groups by reacting at least some of the epoxy (oxirane) groups of the resin with a nucleophilic compound and adding an organic acid and water at some point during the preparation.

The cationic, advanced epoxy resin compositions of the invention have charge densities of from about 0.2 to about 0.9, preferably from about 0.2 to about 0.8, more preferably from about 0.2 to about 0.7 milliequivalent of cationic charge per gram of resin.

The starting epoxy resin component for preparing the cationic, advanced epoxy resin compositions is an advanced resin prepared by reacting a composition comprising a glycidyl ether of an oxyalkylated aromatic or cycloaliphatic or certain aliphatic diol (A-1), a glycidyl ether of a dihydric phenol (A-2) with a dihydric phenol (B) and optionally, a monohydric capping agent (C).

Glycidyl ethers of dihydric phenols useful for the preparation of these resins are those having at least one, and preferably an average of two, vicinal epoxide groups per molecule. These polyepoxides can be produced by condensation of an epihalohydrin with a dihydric phenol in the presence of a basic acting substance.

Useful glycidyl ethers of dihydric phenols are represented by Formulae I and II:

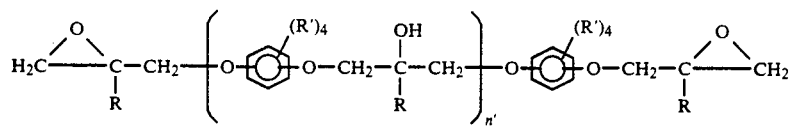

FORMULA I

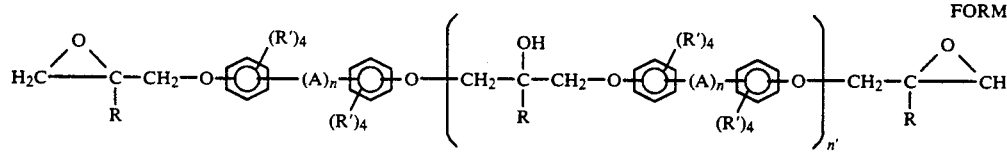

FORMULA II wherein A is a divalent hydrocarbon group having suitably from 1 to 12, more suitably 1 to 6, carbon atoms, —S—, —S—S—, —SO$_2$—, —SO—, —CO—, —O—CO—O—, or —O—; each R is independently hydrogen or a hydrocarbyl group having from 1 to 4 carbon atoms; each R' is independently hydrogen, a hydrocarbyl or hydrocarbyloxy group having from 1 to 4 carbon atoms, or a halogen, preferably chlorine or bromine; n has a value of zero or 1; and n' has a value suitably from zero to 10, more suitably from 0.1 to 5.

The term hydrocarbyl as employed herein means any aliphatic, cycloaliphatic, aromatic, aryl substituted aliphatic or cycloaliphatic, or aliphatic or cycloaliphatic substituted aromatic groups. Likewise, the term hydrocarbyloxy means a hydrocarbyl group having an oxygen linkage between it and the object to which it is attached.

Dihydric phenols useful for the production of these polyepoxides include 2,2-bis(4-hydroxyphenyl)propane (bisphenol A), 1,1-bis(4-hydroxyphenyl)ethane, bis(4-hydroxyphenyl)methane (bisphenol F), p,p'-hydroxybiphenol, resorcinol, hydroquinone, or the like. The particularly preferred polyglycidyl ethers of polyhydric phenols are the diglycidyl ether of bisphenol A and the oligomeric polyglycidyl ethers of bisphenol A.

The diglycidyl ethers of oxyalkylated diols useful in the preparation of the cationic, advanced epoxy resins of the present invention are those which can be represented by the following formulae III and IV:

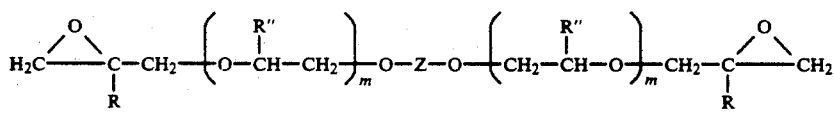

FORMULA III

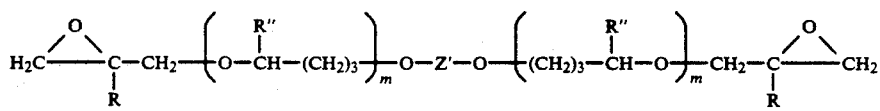

FORMULA IV wherein R is as hereinbefore defined; R" is hydrogen or an alkyl group having suitably from 1 to 6, more suitably from 1 to 4, carbon atoms; each m is independently an integer suitably from 1 to 25, more suitably from 1 to 15, most suitably from 1 to 10; and Z is a divalent aromatic or cycloaliphatic group having suitably from 2 to 20, more suitably from 2 to 12, carbon atoms or Z is a group represented by the following formulas A, B, C, D, E, F, G, H or I:

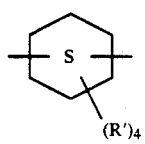

Formula A

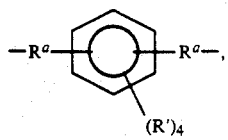

Formula B

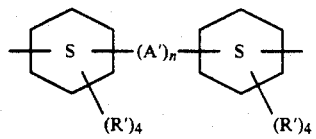

Formula C

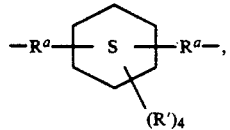

Formula D

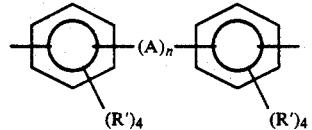

Formula E

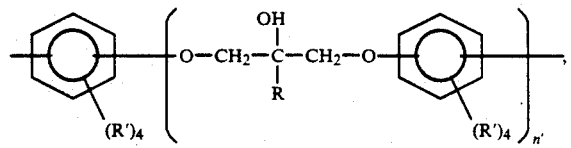

Formula F

-continued

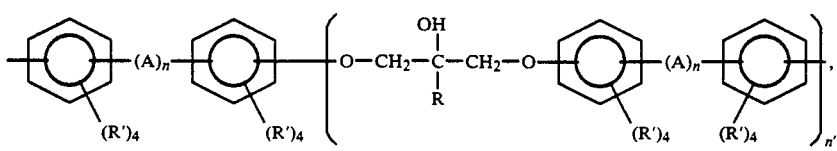

Formula G

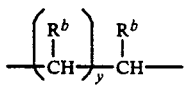

Formula H or

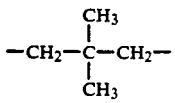

Formula I and Z' is represented by formulas A, B, C, D, E, F, G, I and the following formula J:

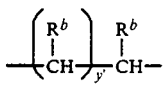

Formula J wherein A, R, R', R", n, and n' are defined as hereinbefore; A' and $R^a$ are divalent hydrocarbon groups having from 1 to about 6 carbon atoms; and $R^b$ is hydrogen or an alkyl group having from 1 to about 6 carbon atoms; y has a value suitably from 2 to about 19, more suitably from about 5 to about 10, most suitably 5; and y' suitably has a value of 2 or from 4 to about 19, more suitably a value from 5 to about 10, most suitably 5.

The glycidyl ethers of the oxyalkylated diols are produced by the condensation of an epihalohydrin with an oxyalkylated polyol represented by the following formulae V or VI:

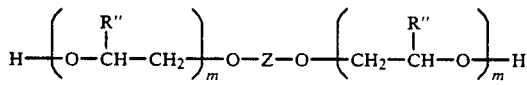

FORMULA V

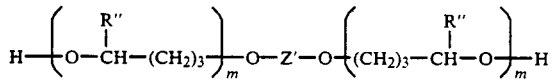

FORMULA VI wherein R", Z, Z', and m are defined as hereinbefore. The resulting halohydrin product is then dehydrohalogenated by known methods with a basic acting substance, such as sodium hydroxide to produce the corresponding diglycidyl ether.

The oxyalkylated diols of Formulae V and VI are produced by reacting a diol of the formulae VII and VIII

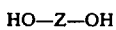    (FORMULA VII)

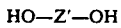    (FORMULA VIII)

wherein Z and Z' is defined as hereinbefore, with the appropriate molar ratio of ethylene oxide, propylene oxide, butylene oxide, tetrahydrofuran, or mixtures thereof. Examples of useful diols include, for example, 1,3-cyclohexanediol, 1,4-cyclohexanediol, 1,4-cyclohexanedimethapol, hydrogenated bisphenol A, bisphenol A, bisphenol F, hydroquinone, dihydroxydiphenyl oxide, p-xylenol and bisphenol capped epoxy resin.

Some of the common methods of synthesis of the diglycidylethers of oxyalkylated diols produce significant amounts of organic chloride-containing impurities. However, other processes are known for preparing products with lower levels of such impurities. While the low-chloride resins are not required for the practice of this invention, they can be used, if desired, for possible improvements in the process of preparing the resins, in the storage properties of the resins or formulated coatings made therefrom or in the performance properties of the products.

Mixtures containing the above two glycidyl ether components are reacted with a dihydric phenol and, optionally, a capping agent to produce epoxy-functional resins having the desired epoxide (oxirane) group content which are used to prepare the cationic resins of the invention. The effective proportions of the diglycidyl ether components range from 10 to 75 weight percent of the diglycidylether of an oxyalkylated diol (A-1) and from 25 to 90 weight percent of the diglycidyl ether of a dihydric phenol (A-2). However, better overall results are obtained with from 10 to 50 weight percent of the diglycidylether of an oxyalkylated diol and from 50 to 90 weight percent of the diglycidylether of a dihydric phenol. Especially preferred is from 15 to 35 weight percent of the diglycidylether of an oxyalkylated diol as hereinbefore defined and correspondingly from 65 to 85 weight percent of the diglycidylether of a dihydric phenol. While products containing higher than 90 percent of the diglycidylether of an oxyalkylated diol will electrodeposit to give high film build, their rupture voltage limits their use to the lower voltages which do not provide sufficient throwing power for many applications such as in electrocoating automobile bodies. The proportions of the glycidyl ether components (A=A-1+A-2) and the dihydric phenol (B) are selected to provide an average epoxy equivalent weight in the advanced epoxy resin of from 350 to 10,000, preferably from 600 to 3,000. Such proportions usually are in the range of from 60 to 90 weight percent of component A and from 10 to 40 weight percent of component B. Useful dihydric phenol compounds include those described above as suitable for production of polyepoxide.

The preferred dihydric phenol is bisphenol A. Also useful are the bisphenols produced by chain extension of the diglycidyl ether of a bisphenol with a molar excess of a bisphenol to produce a diphenolic functional oligomeric product.

The use of capping agents such as monofunctional phenolic compounds provides the advantageous ability to reduce the epoxide content of the resulting product without chain-extension reactions and thus allows independent control of the average molecular weight and the epoxide content of the resulting resin within certain limits. Use of a monofunctional compound to terminate a certain portion of the resin chain ends also reduces the average epoxy functionality of the reaction product. The monofunctional phenolic compound is typically used at levels of zero to 0.7 equivalent of phenolic hydroxyl groups per equivalent of epoxy which would remain after reaction of substantially all of the phenolic groups of the diphenol.

Examples of useful monofunctional capping agents are monofunctional phenolic compounds such as phenol, tertiary-butyl phenol, cresol, para-nonyl phenol, higher alkyl substituted phenols, and the like. Particularly preferred is para-nonyl phenol. The total number of phenolic groups and the ratio of difunctional to monofunctional phenolic compounds, if any are used, are chosen so that there will be a stoichiometric excess of epoxide groups. Ratios are also chosen so that the resulting product will contain the desired concentration of terminal epoxy groups and the desired concentration of resin chain ends terminated by the monophenolic compound after substantially all of the phenolic groups are consumed by reaction with epoxy groups. The capping agent is employed in an amount of from zero to about 15, usually from about 1 to about 15 percent based on the total weight of the A and B components.

These amounts are dependent on the respective equivalent weights of the reactants and the relative amounts of the epoxy-functional components and can be calculated by methods known in the art. In the practice of this invention, the desired epoxide content of the reaction product useful for preparation of the cationic resin is typically between about 1 and about 5 percent, calculated as the weight percentage of oxirane groups, and preferably is from about 2 to about 4 percent. These levels are preferred because they provide, after conversion, the desired cationic charge density in the resinous products useful in cathodic electrodeposition. These cationic resins are produced by conversion of part or all of the epoxy groups to cationic groups as described below.

Reaction of the monofunctional compound with epoxy groups of the polyglycidylether components of the reaction mixture can be done prior to, substantially simultaneously with, or subsequent to the chain-extension reactions of the diphenolic compound and the polyglycidylether components. The preferred method is to have all of the reactants present simultaneously.

Reactions of the above components to produce the epoxy resins are typically conducted by mixing the components and heating, usually in the presence of a suitable catalyst, to temperatures between 130° C. and 200° C., preferably between 150° C. and 175° C., until the desired epoxide content of the product is reached. The reaction can, optionally, be conducted in an appropriate solvent to reduce the viscosity, facilitate mixing and handling, and assist in controlling the heat of reaction.

Many useful catalysts for the desired reactions are known in the art. Examples of suitable catalysts include ethyltriphenylphosphonium acetate.acetic acid complex; ethyltriphenylphosphonium chloride, bromide, iodide, or phosphate; and tetrabutylphosphonium acetate.acetic acid complex. The catalysts are typically used at levels of from about 0.0001 to about 0.05 mole of catalyst per epoxide group.

Appropriate solvents include aromatic solvents, glycol ethers, glycol ether esters, high boiling esters or ketones, or mixtures. Other useful solvents will be apparent to those skilled in the art. Preferred solvents are ethylene glycol monobutylether and propylene glycol monophenylether. Solvent content can range from zero to 30 percent of the reaction mixture. A solvent is usually chosen which is compatible with the subsequent cation-forming reactions and with the final coating composition so that the solvent does not require subsequent removal.

Unexpectedly, incorporation of these glycidyl ethers of oxyalkylated diol into the epoxy resin confer to cathodically electrodepositable coating compositions produced therefrom the ability to build thicker films having controlled thickness during the electrodeposition process, as compared to a similar composition using an epoxy resin not containing the oxyalkylated diol/glycidyl ether component. The ability to deposit thicker films is highly desirable for reducing the number of paint applications required while improving the corrosion resistance and appearance of the electrodeposited coating. The film thickness can be controlled by adjusting the amount of the diglycidylether of an oxylakylated diol as hereinbefore defined incorporated into the epoxy resin. Generally, thickness increases with increasing content of this component.

Another advantage is that the cationic epoxy resins containing the diglycidylether of an aromatic or cycloaliphatic oxyalkylated diol have a lower viscosity at a given temperature than unmodified cationic resins of the same molecular weight. This lower viscosity allows the use of higher molecular weight resins and/or less solvent to achieve a viscosity comparable to an unmodified resin. The lower viscosity resins allow the coating composition greater flowout during deposition and curing which results in better appearance. Alternatively, the lower viscosity resins enable curing at lower temperatures to give equivalent flow and appearance. Finally, coatings produced using these epoxy resins have greater flexibility due to incorporation of the diglycidylether of an oxyalkylated diol component as compared to those based on similar resins not containing that component.

The nucleophilic compounds which are used advantageously in forming the cations required by this invention are represented by the following classes of compounds, sometimes called Lewis bases:
(a) monobasic heteroaromatic nitrogen compounds,
(b) tetra (lower alkyl)thioureas,
(c) $R^1$—S—$R^2$ wherein $R^1$ and $R^2$ individually are lower alkyl, hydroxy lower alkyl or are combined as one alkylene radical having 3 to 5 carbon atoms,
(d)

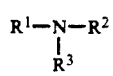

wherein $R^2$ and $R^3$ individually are lower alkyl, hydroxy lower alkyl,

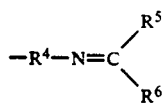

or are combined as one alkylene radical having from 3 to 5 carbon atoms, $R^4$ is an alkylene group having from 2 to 10 carbon atoms, $R^5$ and $R^6$ individually are lower alkyl and $R^1$ is hydrogen or lower alkyl, aralkyl or aryl, except that when $R^2$ and $R^3$ together are an alkylene group then $R^1$ is hydrogen, lower alkyl or hydroxyalkyl and when either or both of $R^2$ and $R^3$ is

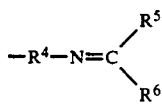

then $R^1$ is hydrogen,
(e)

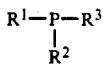

wherein $R^1$, $R^2$ and $R^3$ individually are lower alkyl, hydroxy lower alkyl or aryl.

In this specification the term lower alkyl means an alkyl having from 1 to 6 carbon atoms such as methyl, ethyl, propyl, isopropyl, n-butyl, isobutyl, n-pentyl, isopentyl, n-hexyl and isohexyl or branch chain isomers thereof.

Representative specific nucleophilic compounds are pyridine, nicotinamide, quinoline, isoquinoline, tetramethyl thiourea, tetraethyl thiourea, hydroxyethylmethyl sulfide, hydroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bis-hydroxybutyl sulfide, trimethylene sulfide, thiacyclohexane, tetrahydrothiophene, dimethyl amine, diethyl amine, dibutyl amine, 2-(methylamino)ethanol, diethanolamine and the ketimine derivatives of polyamines containing secondary and primary amino groups such as those produced by the reaction of diethylene triamine or N-aminoethylpiperazine with acetone, methyl ethyl ketone or methylisobutyl ketone; N-methylpiperidine, N-ethylpyrrolidine, N-hydroxyethylpyrrolidine, trimethylphosphine, triethylphosphine, tri-n-butylphosphine, trimethylamine, triethylamine, tri-n-propylamine, tri-isobutylamine, hydroxyethyldimethylamine, butyldimethylamine, trihydroxyethylamine, triphenylphosphorus, and N,N,N-dimethylphenethylamine.

Substantially any organic acid, especially a carboxylic acid, can be used in the conversion reaction to form onium salts so long as the acid is sufficiently strong to promote the reaction between the nucleophilic compound and the vicinal epoxide group(s) on the resinous reactant. In the case of the salts formed by addition of acid to a secondary amine-epoxy resin reaction product, the acid should be sufficiently strong to protonate the resultant tertiary amine product to the extent desired.

Monobasic acids are normally preferred ($H^\oplus A^\ominus$). Suitable organic acids include, for example, alkanoic acids having from 1 to 4 carbon atoms (e.g., acetic acid, propionic acid, etc.), alkenoic acids having up to 5 carbon atoms (e.g., acrylic acid, methacrylic acid, etc.) hydroxy-functional carboxylic acids (e.g., glycolic acid, lactic acid, etc.) and organic sulfonic acids (e.g., methanesulfonic acid), and the like. Presently preferred acids are lower alkanoic acids of 1 to 4 carbon atoms with lactic acid and acetic acid being most preferred. The anion can be exchanged, of course, by conventional anion exchange techniques. See, for example, U.S. Pat. No. 3,959,106 at column 19. Suitable anions are chloride, bromide, bisulfate, bicarbonate, nitrate, dihydrogen phosphate, lactate and alkanoates of 1-4 carbon atoms. Acetate and lactate are the most preferred anions.

The conversion reaction to form cationic resins is normally conducted by merely blending the reactants together and maintaining the reaction mixture at an elevated temperature until the reaction is complete or substantially complete. The progress of the reaction is easily monitored. The reaction is normally conducted with stirring and is normally conducted under an atmosphere of inert gas (e.g., nitrogen). Satisfactory reaction rates occur at temperatures of from 25° C. to 100° C., with preferred reaction rates being observed at temperatures from 60° to 80° C.

Good results can be achieved by using substantially stoichiometric amounts of reactants although a slight excess or deficiency of the epoxy-containing resin or the nucleophilic compounds can be used. With weak acids, useful ratios of the reactants range from 0.5 to 1.0 equivalent of nucleophilic compounds per epoxide group of the resin and 0.6 to 1.1 equivalents of organic acid per epoxide. These ratios, when combined with the preferred epoxide content resins described above, provide the desired range of cationic charge density required to produce a stable dispersion of the coating composition in water. With still weaker acids (e.g., a carboxylic acid, such as acetic acid) a slight excess of acid is preferred to maximize the yield of onium salts. In preparing the compositions in which the cationic group being formed is an onium group, the acid should be present during the reaction of the nucleophilic compounds and the epoxy group of the resin. When the nucleophilic compounds is a secondary amine, the amine-epoxy reaction can be conducted first, followed by addition of the organic acid to form the salt and thus produce the cationic form of the resin.

For the onium-forming reactions, the amount of water that is also included in the reaction mixture can be varied to convenience so long as there is sufficient acid and water present to stabilize the cationic salt formed during the course of the reaction. Normally, it has been found preferable to include water in the reaction in amounts of from 5 to 30 moles per epoxy equivalent. When the nucleophilic compound is a secondary amine, the water can be added before, during, or after the resin epoxy group/nucleophile reaction. The preferred range of charge density of the cationic, advanced epoxy resin is from about 0.2 to about 0.81 whereas the most preferred range is from about 0.2 to about 0.7 milliequivalent of charge per gram of the resin.

It has also been found advantageous to include minor amounts of water-compatible organic solvents in the reaction mixture. The presence of such solvents tends to facilitate contact of the reactants and thereby promote the reaction rate. In this sense, this particular reaction is not unlike many other chemical reactions and the use of such solvent modifiers is conventional. The skilled artisan will, therefore, be aware of which organic solvents can be included. One class of solvents that we have found particularly beneficial are the monoalkyl ethers of the $C_2$-$C_4$ alkylene glycols. This class of compounds includes, for example, the monomethyl ether of ethylene glycol, the monobutyl ether of ethylene glycol, etc. A variety of these alkyl ethers of alkylene glycols are commercially available.

When a desired degree of reaction is reached, any excess nucleophilic compound can be removed by standard methods, e.g., dialysis, vacuum stripping and steam distillation.

The cationic, advanced epoxy resins of this invention in the form of aqueous dispersions are useful as coating compositions, especially when applied by electrodeposition. The coating compositions containing the cationic resins of this invention as the sole resinous component are useful but it is preferred to include crosslinking agents in the coating composition so that the coated films, when cured at elevated temperatures, will be crosslinked and exhibit improved film properties. The most useful sites on the resin for crosslinking reactions are the secondary hydroxyl groups along the resin backbone. Materials suitable for use as crosslinking agents are those known to react with hydroxyl groups and include blocked polyisocyanates; amine-aldehyde resins such as melamine-formaldehyde, urea-formaldehyde, benzoguanine-formaldehyde, and their alkylated analogs; polyester resins; and phenol-aldehyde resins.

Particularly useful and preferred crosslinking agents are the blocked polyisocyanates which, at elevated temperatures, deblock and form isocyanate groups which react with the hydroxyl groups of the resin to crosslink the coating. Such crosslinkers are typically prepared by reaction of the polyisocyanate with a monofunctional active-hydrogen compound.

Examples of polyisocyanates suitable for preparation of the crosslinking agent are described in U.S. Pat. No. 3,959,106 to Bosso, et al., in Column 15, lines 1-24. Also suitable are isocyanate-functional prepolymers derived from polyisocyanates and polyols using excess isocyanate groups. Examples of suitable prepolymers are described by Bosso, et al., in U.S. Pat. No. 3,959,106, Column 15, lines 25-57. In the preparation of the prepolymers, reactant functionality, equivalent ratios, and methods of contacting the reactants must be chosen in accordance with considerations known in the art to provide ungelled products having the desired functionality and equivalent weight.

Preferred polyisocyanates are the isocyanurate trimer of hexamethylene diisocyanate, toluene diisocyanate, methylene diphenylene diisocyanate, isophorone diisocyanate and prepolymers of toluene diisocyanate and trimethylolpropane, dipropylene glycol, tripropylene glycol, or mixtures thereof.

Suitable blocking agents include alcohols, phenols, oximes, lactams, and N,N-dialkylamides or esters of alpha-hydroxyl group containing carboxylic acids. Examples of suitable blocking agents are described in U.S. Pat. No. 3,959,106 to Bosso, et al., in Column 15, line 58, through Column 16, line 6, and in U.S. Pat. No. 4,452,930 to Moriarity. Particularly useful are the oximes of ketones, also known as ketoximes, due to their tendency to deblock at relatively lower temperatures and provide a coating composition which can be cured at significantly lower temperatures. The particularly preferred ketoxime is methyl ethyl ketoxime.

The cationic resins of the invention, when formulated with certain preferred ketoxime-blocked polyisocyanates, provide coating compositions which cure at significantly lower temperatures than those of the prior art.

The blocked polyisocyanates are prepared by reacting equivalent amounts of the isocyanate and the blocking agent in an inert atmosphere such as nitrogen at temperatures between 25° to 100° C., preferably below 70° C. to control the exothermic reaction. Sufficient blocking agent is used so that the product contains no residual, free isocyanate groups. A solvent compatible with the reactants, product, and the coating composition can be used such as a ketone or an ester. A catalyst can also be employed such as dibutyl tin dilaurate.

The blocked polyisocyanate crosslinking agents are incorporated into the coating composition at levels corresponding to from 0.2 to 2.0 blocked isocyanate groups per hydroxyl group of the cationic resin. The preferred level is from about 0.3 to about 1 blocked isocyanate group per resin hydroxyl group.

A catalyst can, optionally, be included in the coating composition to provide faster or more complete curing of the coating. Suitable catalysts for the various classes of crosslinking agents are known to those skilled in the art. For the coating compositions Using the blocked polyisocyanates as crosslinking agents, suitable catalysts include dibutyl tin dilaurate, dibutyl tin diacetate, dibutyl tin oxide, stannous octanoate, and other urethane-forming catalysts known in the art. The preferred catalyst is dibutyl tin dilaurate. Amounts used typically range between 0.1 and 3 weight percent of binder solids.

Unpigmented coating compositions are prepared by blending the cationic resinous product with the crosslinking agent and optionally any additives such as catalysts, solvents, surfactants, flow modifiers, defoamers, or other additives. This mixture is then dispersed in water by any of the known methods. A particularly preferred method is the technique known as phase-inversion emulsification, wherein water is slowly added with agitation to the above mixture, usually at temperatures ranging from ambient to 70° C., until the phases invert to form an organic phase-in-water dispersion. The solids content of the aqueous dispersion is usually between 5 and 30 percent by weight and preferably between 10 and 25 percent by weight for application by electrodeposition.

Pigmented coating compositions are prepared by adding a concentrated dispersion of pigments and extenders to the unpigmented coating compositions. This pigment dispersion is prepared by grinding the pigments together with a suitable pigment grinding vehicle in a suitable mill as known in the art.

Pigments and extenders known in the art are suitable for use in these coatings including pigments which increase the corrosion resistance of the coatings. Examples of useful pigments or extenders include titanium dioxide, talc, clay, lead oxide, lead silicates, lead chromates, carbon black, strontium chromate, and barium sulfate.

Pigment grinding vehicles are known in the art. A preferred pigment grinding vehicle for use in this invention consists of a water-soluble cationic resinous product, water, and a minor amount of glycol ether solvent. The cationic resinous product is prepared by reacting an epichlorohydrin/bisphenol A condensation product having an epoxide group content of 8 percent with a nucleophilic compound, an acid, and water in a similar fashion as described above for the cationic resins used in the preferred embodiment of the invention. The water-soluble product can be diluted with water to form a clear solution useful as a pigment grinding vehicle.

The pH and/or conductivity of the coating compositions can be adjusted to desired levels by the addition of compatible acids, bases, and/or electrolytes known in the art. Other additives such as solvents, surfactants, defoamers, anti-oxidants, bactericides, etc. can also be added to modify or optimize properties of the compositions or the coating in accordance with practices known to those skilled in the art.

Although the coating compositions of the invention can be applied by any conventional technique for aqueous coatings, they are particularly useful for application by cathodic electrodeposition, wherein the article to be coated is immersed in the coating composition and made the cathode, with a suitable anode in contact with the coating composition. When sufficient voltage is applied, a film of the coating deposits on the cathode and adheres. Voltage can range from 10 to 1,000 volts, typically 50 to 500. The film thickness achieved generally increases with increasing voltage. In the case of the coating compositions of the invention, thicker films are achieved by incorporation of the diglycidyl ether of an oxyalkylated diol into the epoxy resin used to produce the cationic resins of the invention. Also, control over the final thickness can be exercised by adjusting the amount of that component used. Current is allowed to flow for between a few seconds to several minutes, typically two minutes over which time the current usually decreases. Any electrically conductive substrate can be coated in this fashion, especially metals such as steel and aluminum. Other aspects of the electrodeposition process, such as bath maintenance, are conventional. After deposition, the article is removed from the bath and typically rinsed with water to remove that coating composition which does not adhere.

The uncured coating film on the article is cured by heating at elevated temperatures, ranging from 200° F. to 400° F. (93° C. to 204° C.), for periods of 1 to 60 minutes.

All of the coating compositions of the invention provide useful cathodically electrodepositable coatings having improved flowout, film build, and deposition properties due to the incorporation of the diglycidyl ether of an oxyalkylated diol component.

Crosslinker A

Toluene diisocyanate (1363.1 g, 15.67 NCO equiv.) is charged to a 5 liter, round-bottomed flask equipped with a condenser, mechanical stirrer, nitrogen inlet, addition funnel and thermometer. The material is heated to 58° C. and a mixture of 308.9 g (1.45 OH equiv.) of polypropylene glycol of average molecular weight of 425 and 1.29 g of T-12 catalyst is added dropwise with cooling to maintain 58° C. An additional 523.5 g (2.46 OH equiv.) of the polypropylene glycol is added afterward. The total time for the two feeds is 140 minutes. 2-Ethylhexanol (1527.6 g, 11.75 OH equiv.) is then added over a period of 220 minutes at 58° C.-63° C. The reaction mixture is then heated at 73° C. for 45 minutes and the resulting blocked isocyanate crosslinker is a clear, viscous liquid at room temperature.

Blocked Isocyanate Crosslinker Solution B

Methylenediphenylene diisocyanate (MDI) having 48% by weight content of 2,4' isomer and an isocyanate equivalent weight of 125.2 g/equiv. (10,746 g, 85.83 equiv.), methylisobutylketone (8,849 g) and dibutyltin dilaurate (15 g) are charged to a reactor and heated to 60° C. A mixture of dipropylene glycol (250 g, 3.73 equiv.), tripropylene glycol (350 g, 3.65 equiv.) and 2-butoxyethanol (9,340 g, 79.15 equiv.) is then added at a rate to keep the reaction below 70° C. After the addition is completed, the temperature is raised to 90° C. for 30 minutes. An infrared spectral analysis of the product shows no isocyanate present. After 30 minutes additional reaction time at 90° C., the product is transferred to containers and cooled.

Blocked Isocyanate Crosslinker Solution C

Methylenediphenylene diisocyanate having 48% by weight content of 2,4' isomer and an isocyanate equivalent weight of 125.2 g/equiv. (1670.6 g, 13.36 equiv.), methylisobutylketone (1349.9 g) and dibutlytin dilaurate (1.67 g) are charged to a reactor and heated to 60° C. A mixture of dipropylene glycol (89.5 g, 1.336 equiv.) and tripropylene glycol (128.3 g, 1.336 equiv.) is then added at a rate to maintain the reaction below 70° C. After the addition is completed, 2-butoxyethanol (1261.7 g, 10.69 equiv.) is added over two hours. After the addition is completed, the temperature is raised to 70° C. for 125 minutes. An infrared spectral analysis of the product solution shows no isocyanate present. The product is transferred to containers for storage and cooled.

Pigment Vehicle A

Into a 5 liter, round-bottomed flask equipped with condenser, addition funnel, nitrogen inlet, mechanical stirrer, and thermometer is charged 920.5 g (4.9 equiv.) of D.E.R. 361 (a commercially available epoxy resin having an epoxide equivalent weight of 188) and 298.1 g (2.61 equiv.) of bisphenol A. The mixture is heated under nitrogen to 85° C. and 1.44 g of a 70% solution of ethyl triphenyl-phosphonium acetate-acetic acid complex in methanol is added. The mixture is heated to 150° C. and allowed to exotherm to 184° C. The temperature is brought down to 175° C. and the reaction is maintained at 175° C. for one hour. The resin is cooled to 83° C. and diluted with 304.6 g methyl ethyl ketone. The solution is cooled to 65° C. and 167.5 g (2.23 equiv.) of 2-(methylamino)ethanol is added over 19 minutes at 64°-70° C. The reaction is heated to 80° C.-84° C. for 65 minutes. The solution is then cooled to 75° C. and 276.8 g (2.23 equiv.) of 72.5% lactic acid solution in water is added. The mixture is then diluted with water to an approximately 40% non-volatile content to produce a clear, viscous solution.

Pigment Dispersion A

Into a one gallon, metal paint can is placed 698.0 g of pigment vehicle A, 108.3 g ASP 200 clay, 41.9 g EP202 lead silicate, 14.7 g Raven 410 carbon black, and 537.0 g R-900 titanium dioxide. A volume of about one-half of the bulk pigment volume of chrome-plated steel diagonals is added and the pigments are ground and dispersed by shaking the sealed paint can on a paint shaker. Water is added as the grinding progressed until a total of 186.0 g of water had been added. The diagonals are removed by passing the dispersion through a screen. The pigment dispersion contained 44.2% pigments by weight.

Pigment Dispersion B

Pigment Dispersion B is a commercially available pigment paste for cathodic electrodeposition available from PPG Industries, Inc., Automotive Electrocoat Office, Cleveland, Ohio under the designation E5994, ED-4 pigment paste. The product is 64% solids by weight, comprised of 11% resin vehicle and 53% pigment solids.

Surfactant Mixture A

A surfactant mixture known in the art is formed by mixing 80 g Ciba-Geigy Amine C, 80 g Air Products Surfynol 104, 105 g 2-butoxyethanol, 14.7 g acetic acid and 225 g water with heating to dissolve. The solution is filtered and then cooled to form a turbid, hazy solution.

COATING PANELS WITH THE COMPOSITIONS

The coating compositions are placed in a stainless steel tank, agitated, and maintained at 80° F. (27° C.) Unpolished steel test panels having Bonderite TM 40 treatment and P60 rinse (available from Advanced Coating Technologies, Inc.) are immersed in the tank and connected as the cathode to a D.C. voltage source, with the tank walls serving as the anode. The desired voltage is applied for two minutes, then the panels are removed, rinsed with deionized water, and baked at the specified temperature for 30 minutes.

Comparative Experiment A

To a 2 liter, round-bottomed flask equipped with a mechanical stirrer, condenser, nitrogen inlet, and a thermometer is charged 665.1 grams (3.56 equiv.) of D.E.R. TM 331 (a liquid epoxy resin, diglycidyl ether of bisphenol A, having an epoxide equivalent weight of 187 available from The Dow Chemical Company), and 335.2 grams (2.94 equiv.) of bisphenol A. The mixture is heated under a nitrogen atmosphere to 97° C. and 1.66 grams of a 70 percent solution of ethyltriphenylphosphonium acetate.acetic acid complex in methanol is added. The mixture is heated to 135° C. and allowed to exotherm to 194° C. The temperature is allowed to fall to 175° C. and maintained at that temperature for one hour. The product is isolated by cooling and flaking. The solid epoxy resin had an epoxide equivalent weight of 1650.

A portion (230.3 grams, 0.14 equiv.) of this solid epoxy resin is heated and dissolved in 57.6 grams of propylene glycol methyl ether in a similar reactor. At 86° C., 10.5 grams (0.14 equiv.) of 2-(methylamino)ethanol is added over a period of ten minutes. The reaction mixture is then held at 90° to 100° C. for 90 minutes. The product is cooled to 80° C. and 105.6 grams of crosslinker A is added and mixed. T-12 catalyst (Air Products) (5.3 grams) and 17.1 grams (0.14 equiv.) of 73.4 percent lactic acid are added sequentially. Water is then added dropwise over a period of two hours at 71° to 79° C. until the mixture inverted to form a milky, aqueous dispersion. The dispersion is cooled and further diluted with water to form an approximately 18 percent non-volatile product.

This aqueous dispersion (1,959.5 g) is pigmented by adding 172.5 g of pigment dispersion A with stirring. The steel test panels are electrocoated at 80° F. (27° C.) for two minutes as the cathode at various voltages in the resulting bath. The coatings are cured at 177° C. for thirty minutes. The resulting film thickness at the indicated voltage are provided in the following Table I.

TABLE I

| Deposition Voltage | Thickness (microns) |
| --- | --- |
| 200 | 1.8 |
| 225 | 1.5 |
| 250 | 1.4 |
| 275 | 1.2 |
| 300 | 1.1 |

The resulting coatings are very rough and had numerous pinholes, characteristic of poor coalescense upon electrodeposition. The decrease of film thickness with increasing deposition voltage is also consistent with poor coalescense. The coatings withstood fifty double rubs with an methyl isobutyl ketone (MIBK), soaked rag without significant marring. The coating demonstrated zero to 3/64 inch corrosion creep from the scribe (total of both sides) after 717 hours under salt spray testing according to ASTM B-117.

Comparative Experiment B

The solid epoxy resin of Comparative Example A is used to prepare another aqueous dispersion in a similar fashion, except that ethylene glycol hexyl ether is used in addition to propylene glycol methyl ether. The weights of each component are provided in the following Table II.

TABLE II

| Component | Weight in grams |
| --- | --- |
| Solid epoxy resin | 230.3 |
| Ethylene glycol hexyl ether | 32.9 |
| Propylene glycol methyl ether | 24.7 |
| 2-(methylamino)ethanol | 10.5 |
| Lactic acid (73.4% solution) | 17.1 |
| Crosslinker A | 101.3 |
| T-12 catalyst | 5.3 |
| Water | 1577.8 |

The aqueous dispersion (1,958.1 g) is pigmented with 178.3 g of pigment dispersion A to prepare a coating bath. Panels are electrocoated as above and oured at 177° C. for 30 minutes. The resulting coatings had the film thickness at the indicated voltage shown in the following Table III.

TABLE III

| Deposition Voltage | Film Thickness (mil) |
| --- | --- |
| 200 | 0.19 |
| 225 | 0.18 |
| 250 | 0.19 |
| 275 | 0.22 |
| 300 | 0.25 |

The coatings had a slight orange peel texture, but are free of pinholes, and the current cutoff during deposition and the film thickness are indicative of adequate coalescense upon deposition. The coatings passed 20 MIBK double rubs without marring but showed some dulling at 50 double rubs. The coating demonstrated 1/32 inch corrosion creep from the scribe (total of both sides) after 717 hours of salt spray testing under ASTM B-117, as well as some field rust.

EXAMPLE 1

Into a 2 liter, round bottomed flask fitted with nitrogen inlet, mechanical stirrer, condenser, and thermometer is charged 88.9 g (0.494 equiv.) of D.E.R. ™ 383 (a liquid epoxy resin having an epoxide equivalent weight of 180 available from The Dow Chemical Company), 66.3 g (0.202 equiv.) of a product which is substantially the diglycidyl ether of an adduct of four moles of ethylene oxide and one mole of bisphenol A (epoxide equivalent weight of 328, prepared by treating the adduct of bisphenol A and ethylene oxide with epichlorohydrin in the presence of Lewis acid catalyst, followed by treatment with sodium hydroxide), and 336.6 g (2.95 equiv.) bisphenol A. The mixture is heated to 70° C. and 1.41 g of a 47 percent solution of ethyltriphenyl phosphonium phosphate in methanol is added. The mixture is heated to 180° C. for three hours. The resin is cooled to 120° C. and 509 (2.83 equiv.) g D.E.R. ™ 383 is added. The mixture is heated to 180° C. and held at that temperature for two hours. The epoxide equivalent weight of the resultant product is 1954. The resin is cooled and diluted with propylene glycol methyl ether to 80 percent non-volatile content by weight.

This resin solution (263.6 g resin solution, 210.88 g of neat resin, 0.108 equiv.) is heated under nitrogen to 85° C. and 8.07 g (0.108 equiv.) of 2-(methylamino)ethanol is added. The reaction mixture is maintained at 82° to 85° C. for one hour. Crosslinker A (94.7 g), T-12 catalyst (4.8 g), and 72.9 percent lactic acid solution (10.7 g, 0.087 equiv.) mixed with 11.7 g water are added sequentially and mixed. Water is added dropwise over a period of 3 hours at temperatures between 82° and 60° C. until the mixture inverted to form an aqueous dispersion. The dispersion is then cooled and further diluted with water to a non-volatile content of 18 percent.

The aqueous dispersion (1,803.9 g) is pigmented with 172.0 g of pigment dispersion A. Panels are electrocoated and cured as described in comparative Examples A and B. The resulting film thicknesses at the indicated voltage are provided in the following Table IV.

TABLE IV

| Deposition Voltage | Film Thickness (mil) |
|---|---|
| 200 | 0.16 |
| 225 | 0.19 |
| 250 | 0.21 |
| 275 | 0.23 |
| 300 | 0.27 |
| 350 | 0.34 |

The coatings are smoother than either comparative Examples A or B and are free of pinholes. Rapid current cutoff is also indicative of improved coalescense relative to comparative Example A. These results are evident even in the absence of a coalescing solvent, such as the ethylene glycol hexyl ether used in comparative Example B. The coatings withstood 100 MIBK double rubs without significant marring. The coating showed 1/64 to 3/64 inch of corrosion creep from the scribe after 671 hours of salt spray testing according to ASTM B-117.

EXAMPLE 2

Ethylene glycol hexyl ether (27.7 g) is added to 1,834 g of the coating bath of Example 1 and the bath is stirred for 24 hours. Additional, panels are then electrocoated to provide a direct comparison to Comparative Example B to show the effect of the modified resin on film thickness. A comparison of Example 1 and Comparative Example A is unsatisfactory for this purpose due to the artificially high film thickness in comparative Example A resulting from poor coalescense and poor current cutoff due to the high particle viscosity in the unmodified resin system.

The resulting coatings have the film thickness at the voltage indicated in the following Table V.

TABLE V

| Deposition Voltage | Thickness (mil) |
|---|---|
| 200 | 0.30 |
| 225 | 0.39 |
| 250 | 0.48 |
| 275 | 0.56 |
| 290 | 2.3 |

The film thickness at a given voltage is higher for this example than for comparative Example B, which has the same solvent content. This demonstrates the increase in thickness due to the resin modification. The coatings are smoother than either comparative Example A or B and are free of pinholes. The panel coated at 290 volts began to rupture and the coating process is stopped, which accounts for the excessive film thickness observed. Rupture is a process where at a specific voltage for the given system, electrodeposition becomes uncontrolled and excessive gassing and deposition take place, due to a lack of current cutoff as the deposit builds. Rupture can occur at progressively lower voltages when the level of solvent becomes too high or the particle viscosity is too low. In this case, this level of solvent is sufficient to bring the rupture voltage for this system down to 290 volts.

The coatings withstand 200 MIBK double rubs without significant marring. Corrosion creep from the scribe after 677 hours of salt spray testing is 1/32 to 3/64 inch (total of both sides of scribe).

EXAMPLE 3

Into a two liter, round-bottomed flask is charged 92.1 g (0.493 equiv.) D.E.R. ™ 331, 49.8 g (0.141 equiv.) of a product which is substantially the diglycidyl ether of an adduct of one mole bisphenol A and six moles ethylene oxide (epoxide equivalent weight of 354, prepared by treating the commercially available adduct with epichlorohydrin in the presence of Lewis acid catalyst, followed by treatment with sodium hydroxide), and 58.8 g (0.516 equiv.) bisphenol A. The mixture is heated under nitrogen to 93° C. and 0.44 g of a 70 percent solution of ethyl triphenyl-phosphonium acetate.acetic acid complex in methanol is added. The mixture is heated to 175° C. and held for 47 minutes, at which time the epoxide equivalent weight is 1780. The product is cooled and diluted with 28.7 g of ethylene glycol hexyl ether and 21.5 g propylene glycol methyl ether and further cooled to 81° C. 2-(methylamino)ethanol (8.4 g, 0.112 equiv.) is added and the temperature is maintained between 87° and 75° C. for one hour. Crosslinker A (89.7 g), T-12 catalyst (4.6 g), and 13.8 g (0.112 equiv.) of a 73.4 percent solution of lactic acid mixed with 14.0 g of water are added sequentially and mixed at 75° C. Water is then added dropwise at 70° to 75° C. until the mixture inverted to form a milky, aqueous dispersion. The dispersion is cooled and further diluted with water to form an approximately 18% non-volatile product.

The aqueous dispersion (1,721.5 g) is pigmented by blending with 158.8 g of Pigment dispersion A and panels are electrocoated and cured as above. The resulting coatings have the following film thickness at the voltage indicated in the following Table VI.

TABLE VI

| Deposition Voltage (Volts) | Film Thickness (mil) |
| --- | --- |
| 175 | 0.47 |
| 200 | 0.55 |
| 225 | 0.65 |
| 250 | 0.71 |

The coatings are much smoother than comparative Examples A and B, with only a slight orange peel texture. The coatings withstand 200 MIBK double rubs without significant marring. Corrosion creep is 1/64 inch (total of both sides) after 714 hours of salt spray exposure.

EXAMPLE 4

Into a similar reactor than the one used in Example 3 is charged 154.7 g (0.827 equiv.) D.E.R. ® 331, 51.6 g (0.172 equiv.) of a product which is substantially the diglycidyl ether of an adduct of one mole bisphenol A and about two moles propylene oxide (prepared in the same fashion as the diglycidyl ether of the bisphenol-/ethylene oxide adduct used in example 3 and having an epoxide equivalent weight of 300), and 93.8 g (0.823 equiv.) of bisphenol A. The mixture is heated under nitrogen to 90° C. and 0.7 g of a 70% solution of ethyl triphenylphosphonium acetate-acetic acid complex in methanol is added. The mixture is heated to 175° C. over a period of 25 minutes and maintained at 175° C. for 75 minutes, at which time the epoxide equivalent weight is 1790. The reaction product is cooled and diluted with 42.9 g of ethylene glycol hexyl ether and 32.2 g of propylene glycol methyl ether. The solution is further cooled to 83° C. and 12.5 g (0.167 equiv.) of 2-(methylamino)ethanol is added over ten minutes. The temperature rose to 87° C. and is then maintained at 85°-87° C. for 100 minutes. Crosslinker A (137.1 g), T-12 catalyst (6.8 g), and 20.4 g (0.166 equiv.) of a 73.4% solution of lactic acid mixed with 20.4 g of water are added sequentially with mixing at 70° to 85° C. Water is added dropwise over a period of 130 minutes at 70° to 77° C. until the mixture inverted to an aqueous dispersion. The dispersion is cooled and diluted with water to 18% non-volatile content.

The aqueous dispersion (2,509.5 g) is pigmented with 221.5 g of pigment dispersion A and panels are electrocoated and cured as described. The coatings have film thicknesses as indicated in the following Table VII.

TABLE VII

| Deposition voltage (volts) | Film Thickness (mil) |
| --- | --- |
| 200 | 0.20 |
| 225 | 0.23 |
| 250 | 0.29 |
| 275 | 0.34 |
| 300 | 0.41 |
| 350 | 0.51 |
| 400 | 0.67 |

The coatings are smoother and possess a higher gloss than comparative Experiments A and B. The coating withstand 100 MIBK double rubs without marring, but showed marring after 200. Corrosion creep from the scribe is to 1/64 in. (0.397 mm) to 1/32 in. (0.794 mm), total, after 714 hours of salt spray exposure.

EXAMPLE 5

A. Preparation of Advanced Epoxy Resin

A diglycidyl ether of an adduct of one mole bisphenol A and about 3.4 moles (per mole bisphenol A on the average) propylene oxide having an epoxide equivalent weight of 341 g/eq and containing 2.99 wt % total chlorides (727.0 g, 2.13 eq), bisphenol A (621.8 g, 5.45 eq) and a diglycidyl ether of bisphenol A having an EEW of 188 (1054.8 g, 5.61 eq) are charged to a reactor and heated under nitrogen to 91° C. A 70% solution of ethyltriphenylphosphonium acetate.acetic acid complex in methanol (5.4 g, 9.22 milliequiv.) is added and the mixture is heated to 175° C. and held there for 75 minutes. The product is cooled to below 115° C. and 120.2 g xylene and 762.8 g methylisobutylketone are added. The epoxide equivalent weight (EEW) at this point is 1029 g/eq, based on non-volatiles.

B. Preparation of Cationic Resin

The above solution is cooled to 95° C. and diethanolamine at 1 eq/eq epoxide in the reactor (245.3 g, 2.34 eq) is then added and the reaction exotherms to 104° C. The reaction mixture is then maintained at 100° C. for two hours. The product shows 0.794 milliequiv. base/g solids at 78.5% solids.

A portion of this amine adduct solution (250 g of solids) is blended with 142.9 g of blocked isocyanate crosslinker solution B at ambient temperature. Propylene glycol phenyl ether (10.5 g), surfactant mixture A (5.6 g) and acetic acid (0.85 eq/eq base in the amine adduct) are then added and mixed. Water is then added dropwise until inversion. The dispersion is then diluted to 30-35% non-volatiles with water. The methylisobutylketone and xylene are evaporated out of the aqueous dispersion by stirring two days under a gentle stream of nitrogen.

EXAMPLE 6

A. Preparation of Advanced Epoxy Resin

A diglycidyl ether of an adduct of one mole bisphenol A and about 6 moles (per mole bisphenol A on the average) ethylene oxide having an epoxide equivalent weight of 366 g/eq (292.1 g, 0.798 eq), bisphenol A (225.2 g, 1.98 eq), a diglycidyl ether of bisphenol A having an EEW of 188 (382.7 g, 2.04 eq) and 45.0 g xylene are charged to a reactor and heated under nitrogen to 90° C. A 70% solution of ethyltriphenylphosphonium acetate-acetic acid complex in methanol (1.99 g, 3.40 milliequiv.) is added and the mixture is heated to 175° C. and held there for 80 minutes. The product is cooled to below 115° C. and 287.1 g methylisobutylketone is added. The epoxide equivalent weight (EEW) at this point is 1062 g/eq, based on non-volatiles.

B. Preparation of Cationic Resin

The above solution is cooled to 92° C. and diethanolamine at 1 eq/eq epoxide in the reactor (86.8 g, 0.827 eq) is then added and the reaction exotherms to 98° C. The reaction mixture is then maintained at 100° C. for two hours. The product shows 0.790 milliequiv. base/g solids at 78.9% solids.

A portion of this amine adduct solution (250 g of solids) is blended with 142.9 g of blocked isocyanate crosslinker solution B at ambient temperature. Propylene glycol phenyl ether (10.5 g), surfactant mixture A (5.6 g) and acetic acid (0.8 eq/eq base in the amine adduct) are then added and mixed. Water is then added dropwise until inversion. The dispersion is then diluted to 30–35% non-volatiles with water. The methylisobutylketone and xylene are evaporated out of the aqueous dispersion by stirring two days under a gentle stream of nitrogen.

EXAMPLE 7

A. Preparation of Advanced Epoxy Resin

A diglycidyl ether of an adduct of one mole bisphenol A and about 3.4 moles (per mole bisphenol A on he average) propylene oxide having an epoxide equivalent weight of 392 g/eq and containing 145 ppm by weight of total chlorides (225.9 g, 0.576 eq), bisphenol A (157.0 g, 1.38 eq), a diglycidyl ether of bisphenol A having an EEW of 188 (267.1 g, 1.42 eq) and 32.5 g xylene are charged to a reactor and heated under nitrogen to 94° C. A 70% solution of ethyltriphenylphosphonium acetate-acetic acid complex in methanol (1.40 g, 2.39 milliequiv.) is added and the mixture is heated to 175° C. and held there for 195 minutes. The product is cooled to 122° C. and 0.4 g (0.68 milliequiv.) of the above phosphonium solution is added. The reaction mixture is reheated to 175° C. and maintained there for 81 minutes. The epoxide equivalent weight (EEW) at this point is 1057 g/eq, based on non-volatiles. The solution is cooled to 115° C. and 207.0 g methylisobutylketone is added. The solution is cooled to ambient temperature.

B. Preparation of Cationic Resin

The above solution is heated to 90° C. and diethanolamine at 1 eq/eq epoxide in the reactor (62.8 g, 0.598 eq) is then added and the reaction exotherms to 99° C .The reaction mixture is then maintained at 100° C. for two hours. The product shows 0.829 milliequiv. base/g solids at 77.2% solids.

A portion of this amine adduct solution (250 g of solids) is blended with 142.9 g of blocked isocyanate crosslinker solution B at ambient temperature. Propylene glycol phenyl ether (10.5 g), surfactant mixture A (5.6 g) and acetic acid (0.8 eq/eq base in the amine adduct) are then added and mixed. Water is then added dropwise until inversion. The dispersion is then diluted to 30–35% non-volatiles with water. The methylisobutylketone and xylene are evaporated out of the aqueous dispersion by stirring two days under a gentle stream of nitrogen.

EXAMPLE 8

The aqueous resin dispersions from Examples 5–7 are diluted to 18% non-volatiles and filtered. The dispersions are then pigmented by adding, with continuous stirring, an appropriate amount of Pigment Dispersion B to yield a pigment-to-binder weight ratio of 0.3, with binder counted as the solids in the resin dispersion and pigment vehicle. The pigmented dispersion is stirred overnight, filtered and then used as the coating bath for electrodeposition. Test panels are coated as described above. The panels are cured at 177° C. for thirty minutes. Results of electrodeposition coating of the coating baths made from examples 5–7 are summarized in the following Table VIII.

TABLE VIII

| | Coating Designation | | |
|---|---|---|---|
| | A | B | C |
| Cationic | Ex. 5 | Ex. 6 | Ex. 7 |

TABLE VIII-continued

| | Coating Designation | | |
|---|---|---|---|
| | A | B | C |
| resin employed | | | |
| Dispersion conductivity | 2,010 | 2,090 | 2,025 |
| Rupture voltage | 275 | 275 | 250 |
| Coating thickness at 225 volts | | | |
| mils | 0.45 | 0.81 | 0.63 |
| microns | 11 | 21 | 16 |
| Coating thickness at 250 volts | | | |
| mils | 0.54 | 1.13 | — |
| micron | 14 | 29 | — |

EXAMPLE 9

A. Preparation of Advanced Epoxy Resin

A diglycidyl ether of an adduct of one mole bisphenol A and about 3.9 moles (per mole bisphenol A on the average) butylene oxide having an epoxide equivalent weight of 386 g/eq (253.1 g, 0.656 eq), bisphenol A (187.5 g, 1.64 eq) and a diglycidyl ether of bisphenol A having an EEW of 185.2 (309.4 g, 1.67 eq) are charged to a reactor and heated under nitrogen to 95° C. A 70% solution of ethyltriphenylphosphonium acetate-acetic acid complex in methanol (0.95 g, 1.62 milliequiv.) is added and the mixture is heated to 175° C. and held there for 52 minutes. The product is cooled to below 130° C. and 139.0 g methylisobutylketone (MIBK) is added. The epoxide equivalent weight (EEW) at this point is 1157 g/eq, based on non-volatiles.

B. Preparation of Cationic Resin

The above solution is cooled to 95° C. and diethanolamine at 1 eq/eq epoxide in the reactor (65.5 g, 0.624 eq) is then added. The reaction mixture is then maintained at 100° C. for 125 minutes. The reaction product is then diluted with 123.5 g MIBK. The product shows 0.767 milliequiv. base/g solids at 75% solids.

A portion of this amine adduct solution (225 g of solids) is blended with 178.6 g of blocked isocyanate crosslinker solution C at ambient temperature. Propylene glycol phenyl ether (14.1 g), surfactant mixture A (4.6 g) and lactic acid (0.7 eq/eq base in the amine adduct) are then added and mixed. Water is then added dropwise until inversion. The dispersion is then diluted to 30–35% non-volatiles with water. The methylisobutylketone is evaporated out of the aqueous dispersion by stirring two days under a gentle stream of nitrogen.

C. Coating and Testing

A coating bath is prepared as in Example 8 except a pigment to binder ratio of 0.25 was used. Panels were electrocoated and cured at 177° C. for 30 minutes. Results are summarized in the following Table IX.

TABLE IX

| Conductivity = 1465 micromho/cm (unpigmented) | | |
|---|---|---|
| Rupture voltage = 300 volts | | |
| Voltage | Coating thickness | |
| (volts) | (mils) | (microns) |
| 225 | 0.71 | 18 |
| 250 | 0.77 | 20 |

TABLE IX-continued

Conductivity = 1465 micromho/cm (unpigmented)
Rupture voltage = 300 volts

| Voltage (volts) | Coating thickness (mils) | (microns) |
|---|---|---|
| 275 | 0.97 | 25 |

EXAMPLE 10

A. Preparation of Advanced Epoxy Resin

A diglycidyl ether of an adduct of one mole bisphenol A and about 11.1 moles (per mole bisphenol A on the average) butylene oxide having an epoxide equivalent weight of 601 g/eq (206.7 g, 0.344 eq), bisphenol A (183.2 g, 1.61 eq) and a diglycidyl ether of bisphenol A having an EEW of 185.2 (360.2 g, 1.945 eq) are charged to a reactor and heated under nitrogen to 96° C. A 70% solution of ethyltriphenylphosphonium acetate-acetic acid complex in methanol (0.94 g, 1.6 milliequiv.) is added and the mixture is heated to 175° C. and held there for 56 minutes. The product is cooled to below 117° C. and 139.7 g methylisobutylketone (MIBK) is added. The epoxide equivalent weight (EEW) at this point is 1163 g/eq, based on non-volatiles.

B. Preparation of cationic resin

The above solution is cooled to 92° C. and diethanolamine at 1 eq/eq epoxide in the reactor (65.5 g, 0.624 eq) is then added. The reaction mixture is then maintained at 100° C. for 216 minutes. The reaction product is then diluted with 124.2 g MIBK. The product shows 0.775 milliequiv. base/g solids at 75% solids.

A portion of this amine adduct solution (225 g of solids) is blended with 178.6 g of blocked isocyanate crosslinker solution C at ambient temperature. Propylene glycol phenyl ether (14.1 g), surfactant mixture A (4.6 g) and tactic acid (0.6 eq/eq base in the amine adduct) are then added and mixed. Water is then added dropwise until inversion. The dispersion is then diluted to 30-35% non-volatiles with water. The methylisobutylketone is evaporated out of the aqueous dispersion by stirring two days under a gentle stream of nitrogen.

C. Coating and Testing

A coating bath is prepared as in Example 8 except a pigment to binder ratio of 0.25 was used. Panels were electrocoated and cured at 177° C. for 30 minutes. Results are summarized in the following Table X.

TABLE X

Conductivity = 1233 micromho/cm (unpigmented)
Rupture voltage = 325 volts

| Voltage (volts) | Coating thickness (mils) | (microns) |
|---|---|---|
| 225 | 0.77 | 20 |
| 250 | 0.90 | 23 |
| 275 | 0.99 | 25 |
| 300 | 1.24 | 31 |

What is claimed is:
1. A cationic, advanced epoxy resin having a charge density of from about 0.2 to about 0.9 milliequivalent of cationic charge per gram of resin prepared by reacting in the presence of a suitable catalyst
(A) a composition comprising
(1) at least one diglycidyl ether of (a) an oxyalkylated aromatic diol or (b) an oxyalkylated cycloaliphatic diol or (c) an oxyalkylated aliphatic diol represented by the following formulae III or IV:

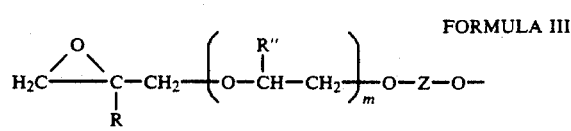

FORMULA III

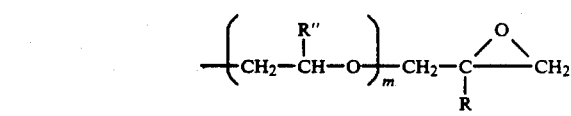

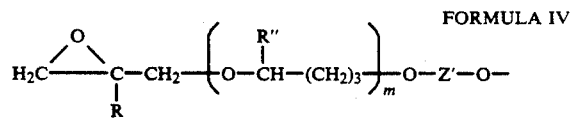

FORMULA IV

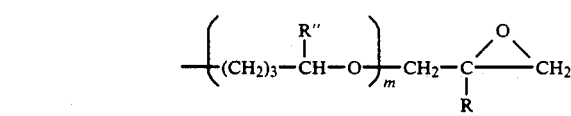

wherein each R is independently hydrogen or an alkyl group having from 1 to about 4 carbon atoms; R″ is hydrogen or an alkyl group having from 1 to 6 carbon atoms; each m is independently an integer from 1 to 25; and Z is a group represented by the following formulas A, B, C, D, E, F, G or I:

Formula A

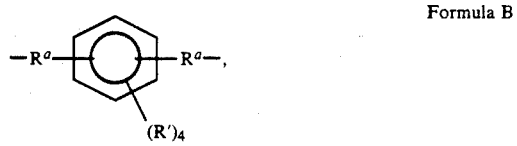

Formula B

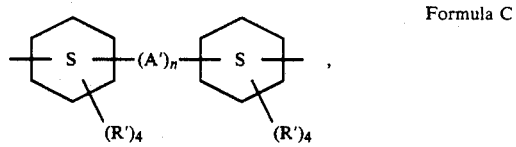

Formula C

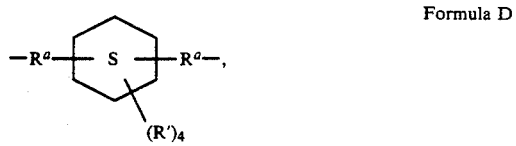

Formula D

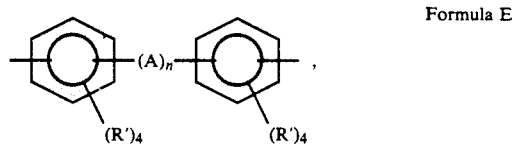

Formula E

-continued

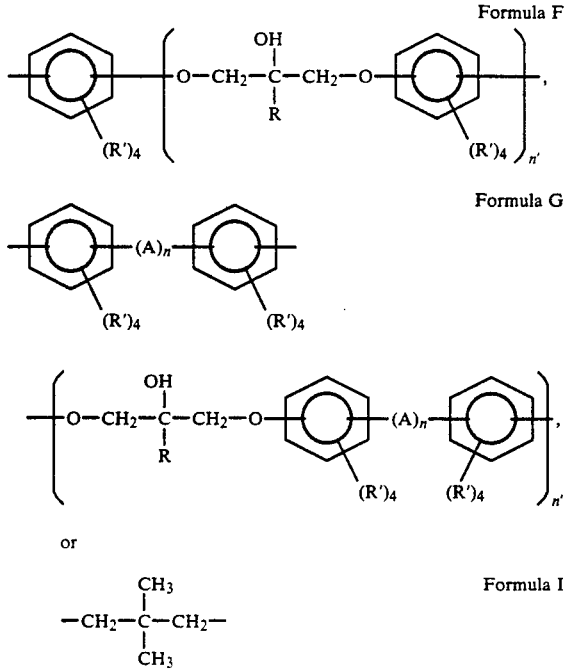

and Z' is represented by formulas A, B, C, D, E, F, G or I. wherein A is a divalent hydrocarbon group having from 1 to 12 carbon atoms, —S—, —S—S—, —SO$_2$—, —SO—, —CO—, —O—, CO—O—, or —O—; A' is a divalent hydrocarbon group having from 1 to about 6 carbon atoms; each R is independently hydrogen or a hydrocarbyl group having from 1 to 4 carbon atoms; each R' is independently hydrogen, a hydrocarbyl or hydrocarbyloxy group having from 1 to 4 carbon atoms, or a halogen; R$^a$ is a divalent hydrocarbon group having from 1 to about 6 carbon atoms; n has a value of zero or 1; n' has a value from zero to 10; y has a value from 2 to about 19; and (2) at least one diglycidyl ether of a dihydric phenol; with (B) at least one dihydric phenol;

wherein components (A-1) and (A-2) are employed in quantities such that from about 10 to about 75 weight percent of the diglycidyl ethers contained in component (A) are contributed by Component (A-1) and from 25 to about 90 weight percent of such glycidyl ethers are contributed by component (A-2) and components (A) and (B) are employed in such quantities that the resultant advanced epoxy resin has an average epoxide equivalent weight of from about 350 to about 10,000, whereby there is formed an advanced epoxy resin having terminal oxirane groups; and subsequently converting the oxirane groups to cationic groups by reacting the resin with a nucleophile and adding an organic acid and water.

2. The cationic, advanced epoxy resin of claim 1 in which the amount of diglycidylether of an oxyalkylated aromatic diol or oxyalkylated cycloaliphatic diol or oxyalkylated aliphatic diol is from about 10 weight percent to about 50 weight percent and wherein A is a divalent hydrocarbon group having from 1 to about 6 carbon atoms; each R is hydrogen; m has a value from 1 to about 15; n has a value of 1; and n' has a value from 0.1 to about 5; and wherein the advanced epoxy-based resin has a charge density of from about 0.2 to about 0.8 milliequivalent of cationic charge per gram of resin.

3. The cationic, advanced epoxy resin of claim 2 in which the amount of diglycidylether of an oxyalkylated aromatic or cycloaliphatic diol is from about 15 weight percent to about 35 weight percent; and wherein the cationic, advanced epoxy resin has a charge density of from about 0.2 to about 0.7 milliequivalent of cationic charge per gram of resin.

4. The cationic, advanced epoxy resin of claim 3 in which the epoxide equivalent weight of the advanced epoxy resin is from about 600 to about 3,000.

5. The cationic, advanced epoxy resin of claim 4 in which the diglycidylether of a dihydric phenol has the formula

FORMULA I

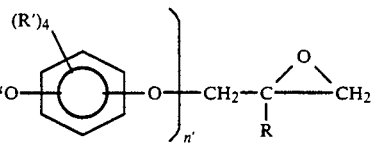

wherein each R independently is hydrogen or a hydrocarbyl group having from 1 to 3 carbon atoms, each R' independently is hydrogen, a hydrocarbyl or a hydrocarbyloxy group having from 1 to about 4 carbon atoms or a halogen and n' has a value from zero to about 10.

6. The cationic, advanced epoxy resin of claim 4 in which the diglycidylether of a dihydric phenol has the formula

FORMULA II

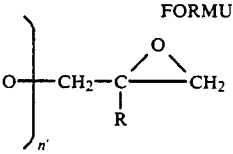

wherein A is a divalent hydrocarbon group having from 1 to 12 carbon atoms; —S—, —S—S—, —SO—, —SO$_2$—, —CO—, —O—CO—O—, or —O—; each R is independently hydrogen or a hydrocarbyl group having from 1 to 4 carbon atoms; each R' is independently hydrogen, a hydrocarbyl or hydrocarbyloxy group having from 1 to 4 carbon atoms, or a halogen; n has a value of zero or 1; and n' has a value from zero to 10.

7. The cationic, advanced epoxy resin of claim 6 in which the amount of component (A) is from about 60 percent to about 90 percent and the amount of component (B) is from about 40 percent to about 10 percent, the percentage being based on the total weight of components (A) and (B).

8. The cationic, advanced epoxy resin of claim 7 wherein the advanced epoxy resin, before conversion to a cationic resin, has an oxirane content of from about 1 to about 5 percent based on the total weight of the resin.

9. The cationic, advanced epoxy resin of claim 8 wherein the advanced epoxy resin, before conversion to a cationic resin, has an oxirane content of from about 2 percent to about 4 percent, based on the total weight of resin.

10. In a process for the preparation of an cationic advanced epoxy resin from an epoxy resin composition having terminal oxirane groups which includes the step of converting oxirane groups to cationic groups by reacting a nucleophile with at least some of the oxirane groups of the epoxy resin composition wherein an organic acid and water are added during some part of this conversion, the improvement of using as the epoxy resin composition an advanced epoxy resin obtained by reacting in the presence of a suitable catalyst (A) a composition comprising
(1) at least one diglycidyl ether of (a) an oxyalkylated aromatic diol or (b) an oxyalkylated cycloaliphatic diol or (c) an oxyalkylated aliphatic diol represented by the following formulae III or IV:

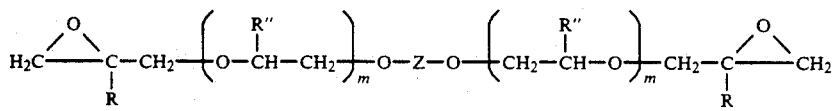

FORMULA III

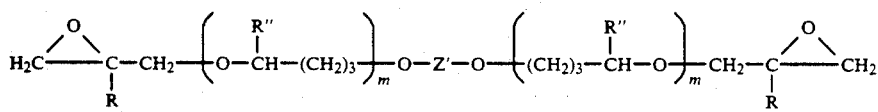

FORMULA IV wherein R is hydrogen or an alkyl group having from 1 to about 4 carbon atoms; R'' is hydrogen or an alkyl group having from 1 to 6 carbon atoms; each m is independently an integer from 1 to 25; and Z is a group represented by the following formulas A, B, C, D, E, F, G or I:

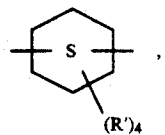

Formula A

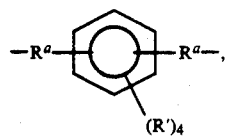

Formula B

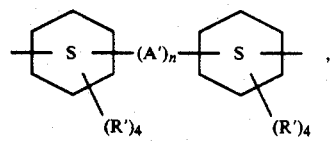

Formula C

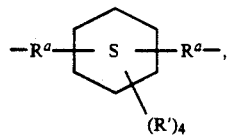

Formula D

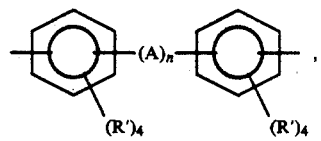

Formula E

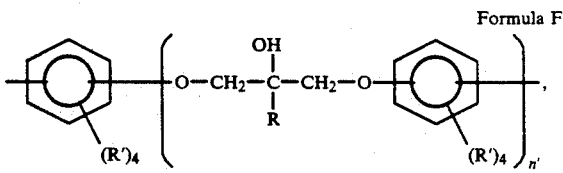

Formula F

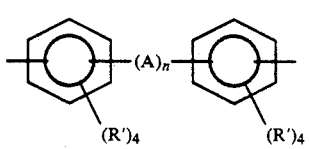

Formula G

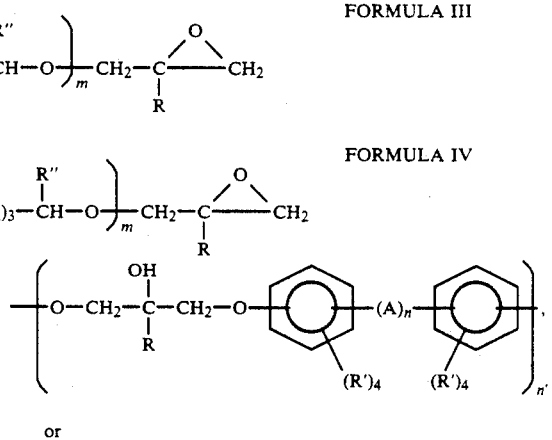

or

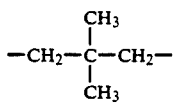

Formula I and Z' is represented by formulas A, B, C, D, E, F, G, I wherein A is a divalent hydrocarbon group having from 1 to 12 carbon atoms, —S—, —S—S—, —SO$_2$—, —SO—, —CO—, —O—CO—O—, or —O—; A' is a divalent hydrocarbon group having from 1 to about 6 carbon atoms; each R is independently hydrogen or a hydrocarbyl group having from 1 to 4 carbon atoms; each R' is independently hydrogen, a hydrocarbyl or hydrocarbyloxy group having from 1 to 4 carbon atoms, or a halogen; R$^a$ is a divalent hydrocarbon group having from 1 to about 6 carbon atoms; n has a value of zero or 1; n' has a value from zero to 10; y has a value from 2 to about 19; and (2) a diglycidylether of a dihydric phenol; with
(B) at least one dihydric phenol;
wherein (A-1) and (A-2) are employed in such quantities that about 10 to about 75 weight percent of the glycidyl ethers contained in component (A) are contributed by (A-1) and from about 25 weight percent to about 90 weight percent of the glycidyl ethers are contributed by (A-2) and wherein components (A) and (B) are employed in such quantities that the resultant advanced epoxy resin epoxide equivalent weight is from about 350 to about 10,000; whereby there is obtained a cationic, advanced epoxy resin having a charge density of from about 0.2 to about 0.9 milliequivalent of charge per gram of resin.

11. The process of claim 10 in which the amount of diglycidylether of an oxyalkylated aromatic diol or oxyalkylated cycloaliphatic diol or oxyalkylated aliphatic diol is from about 10 weight percent to about 50 weight percent and wherein A is a divalent hydrocarbon group having from 1 to about 6 carbon atoms; each R is hydrogen; m has a value from 1 to about 15; n has a value cf 1; and n' has a value from 0.5 to about 5; and the advanced epoxy-based resin has a charge density of from about 0.2 to about 0.8 milliequivalent of cationic charge per gram of resin.

12. The process of claim 11 in which the amount of diglycidylether of an oxyalkylated aromatic diol or cycloaliphatic diol or oxyalkylated aliphatic diol is from about 15 weight percent to about 35 weight percent; and the cationic, advanced epoxy resin has a charge density of from about 0.2 to about 0.7 milliequivalent of cationic charge per gram of resin.

13. The process of claim 12 in which the epoxide equivalent weight of the advanced epoxy resin is from about 600 to about 3,000.

14. The process of claim 13 in which the diglycidylether of a dihydric phenol has the formula

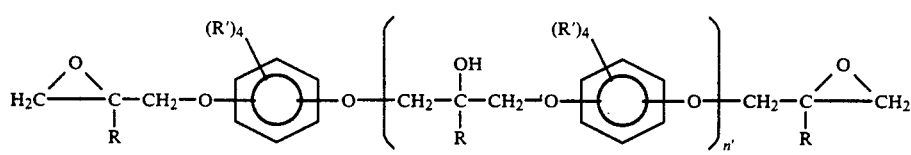

FORMULA I wherein each R independently is hydrogen or a hydrocarbyl group having from 1 to 3 carbon atoms, each R' independently is hydrogen, a hydrocarbyl or a hydrocarbyloxy group having from 1 to about 4 carbon atoms or a halogen and n' has a value from zero to about 10.

15. The process of claim 14 in which n' has a value from 0.1 to about 5.

16. The process of claim 15 in which the amount of component (A) is from about 60 percent to about 90 percent and the amount of component (B) is from about 40 percent to about 10 percent, the percentage being based on the total weight of components (A) and (B).

17. The process of claim 13 in which the diglycidylether of a dihydric phenol has the formula

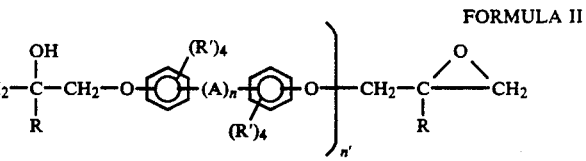

FORMULA II wherein A is a divalent hydrocarbon group having from 1 to 12 carbon atoms; —S—, —S—S—, —SO—, —SO$_2$—, —CO—, —O—CO—O—, or —O—; each $R^1$ is independently hydrogen, a hydrocarbyl or hydrocarbyloxy group having from 1 to 4 carbon atoms, or a halogen; R is independently hydrogen or a hydrocarbyl group having from 1 to 3 carbon atoms; n has a value from zero to 1; ad n' has a value from zero to 10.

18. The process of claim 17 in which n' has a value from 0.1 to about 5.

19. The process Of claim 18 in which the amount of component (A) is from about 60 percent to about 90 percent and the amount of component (B) is from about 40 percent to about 10 percent, the percentage being based on the total weight of components (A) and (B).

20. The process of claim 16 wherein the advanced epoxy resin, before conversion to a cationic resin, has an oxirane content of from about 1 to about 5 percent based on the total weight of the resin.

21. The process of claim 20 wherein the advanced epoxy resin, before conversion to a cationic resin, has an oxirane content of from about 2 percent to about 4 percent, based on the total weight of resin.

22. The process of claim 18 wherein the advanced epoxy resin, before conversion to a cationic resin, has an oxirane content of from about 1 to about 5 percent based on the total weight of the resin.

23. The process of claim 22 wherein the advanced epoxy resin, before conversion to a cationic resin, has an oxirane content of from about 2 percent to about 4 percent, based on the total weight of resin.

24. A composition of claim 10 wherein component (A1) is represented by formula IV wherein Z' is represented by formula E.

25. A composition of claim 24 wherein component (A1) is present in an amount such that from about 10 to about 50 percent of the diglycidyl ether groups contained in component (A) is contributed by component (A1).

* * * * *

UNITED STATES PATENT AND TRADEMARK OFFICE
CERTIFICATE OF CORRECTION

PATENT NO. : 5,248,741
DATED : September 28, 1993
INVENTOR(S) : Kenneth W. Anderson and Richard A. Hickner It is certified that error appears in the above-identified patent and that said Letters Patent is hereby corrected as shown below:

In claim 10, line 16, column 29, after "cationic" insert --,--.

In claim 10, line 56, column 30, "G,I" should read --G or I.--.

In claim 11, line 31, column 31, "cf" should read --of--.

In claim 17, line 23, column 32, "ad" should read --and--.

In claim 19, line 26, column 32, "Of" should read --of--.

In claim 22, line 39, column 32, "18" should read --19--.

Signed and Sealed this

Fifth Day of July, 1994

Attest:

BRUCE LEHMAN

*Attesting Officer*      *Commissioner of Patents and Trademarks*